Dec. 25, 1962 T. B. KLAIBAN 3,069,781
MEASURING GAUGE AND GUIDE FOR RADIAL ARM POWER TOOLS
Filed March 13, 1961
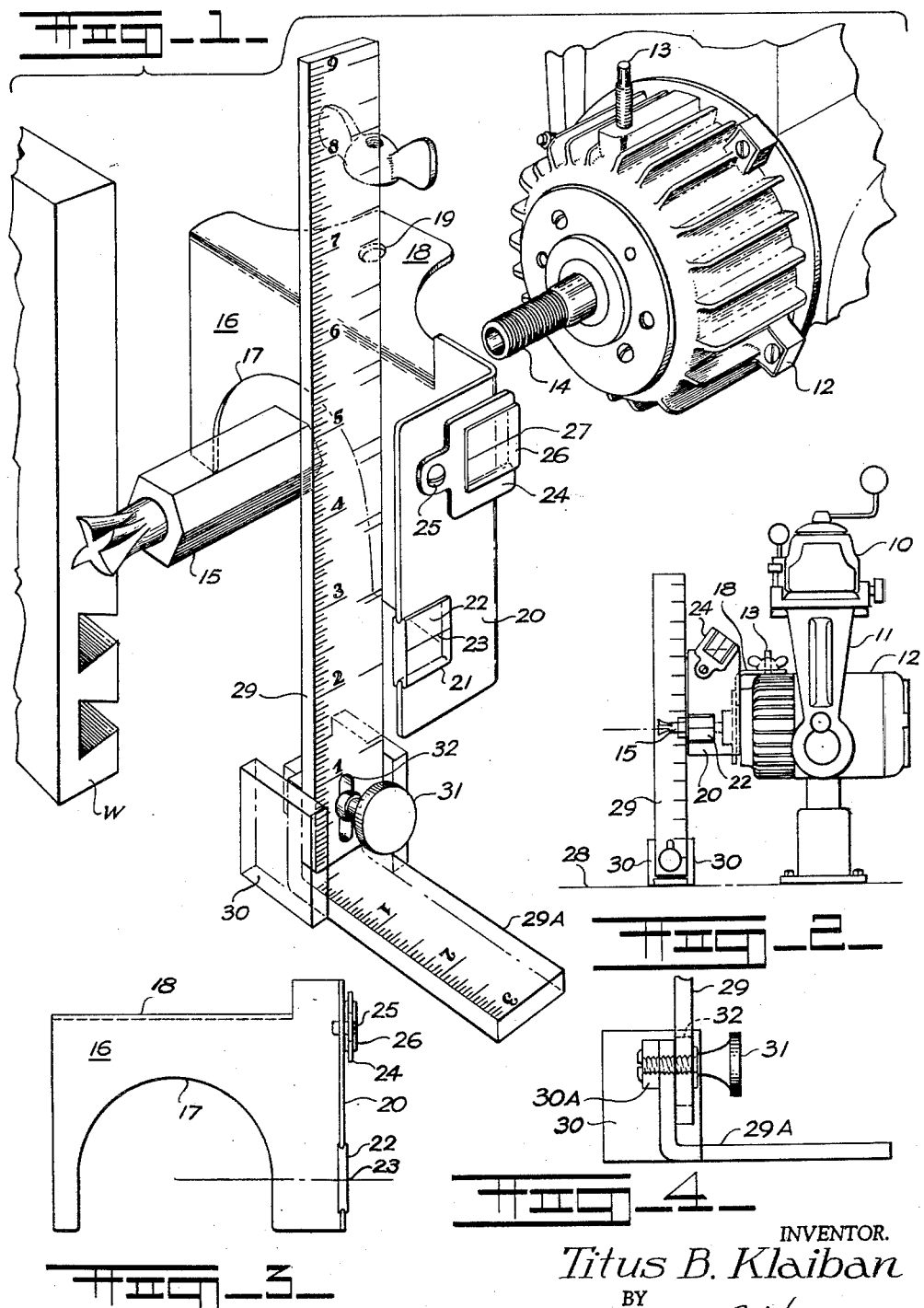
INVENTOR.
*Titus B. Klaiban*
BY
*W. B. Harpman*
ATTORNEY.

United States Patent Office 3,069,781
Patented Dec. 25, 1962

3,069,781
MEASURING GAUGE AND GUIDE FOR
RADIAL ARM POWER TOOLS
Titus B. Klaiban, 659 Chestnut Ridge, Hubbard, Ohio
Filed Mar. 13, 1961, Ser. No. 95,286
4 Claims. (Cl. 33—185)

This invention relates to a radial arm mounted power tool such as used in a home workshop and more particularly to a measuring gauge and guide for use therewith.

The principal object of the invention is the provision of a measuring gauge and guide for a radial arm power tool that enables the tool to be positioned at various pre-determined locations.

A further object of the invention is the provision of a measuring gauge and guide for a power tool which may be easily and quickly attached to a power tool for use therewith.

A still further object of the invention is the provision of a measuring guide that can be quickly and easily attached to a power tool and used in conjunction with a separate measuring gauge positioned adjacent a workpiece so that the power tool can be engaged upon the workpiece in exact conformity with the measuring gauge.

A still further object of the invention is the provision of a measuring guide and a measuring gauge for use with a power tool of the radial arm type and comprising simple and inexpensive constructions which may be produced at low cost.

The measuring gauge and guide disclosed herein comprises an improvement in devices used on or with power tools of the radial arm type or the like such as, for example, are commonly called radial arm power saws and wherein the saw blades are detachable and other tools are attachable in place thereof. Such tools are widely used in cabinet work and one problem has been to provide dovetail slots in front drawer panels so that the sides of the drawer being constructed can be properly engaged in the front drawer panel. In power tools heretofore known in the art, dovetail routers have been interchangeably used with the saw blades and other tools and such dovetail routers can be moved into end engagement with a front drawer panel, for example, to form the dovetail slots therein which are desired. The various power tools heretofore known in the art have not provided any means of gauging the location of the dovetail slots to be formed with the result that the formation of such slots with this equipment has become a hit or miss affair with the dovetail slots irregularly placed and therefore not satisfactorily formed. A similar problem exists in drilling a row of vertically spaced holes as may be necessary in providing means for holding pegs or the like and similar uses will occur to those skilled in the art and familiar with the operation of the power tools referred to. Using the dovetail slots in the ends of the front panels of a drawer to be formed as an example it is obviously desirable that these slots be evenly spaced in a vertical pattern in the ends of the front panel so that the dovetail projections formed on the ends of the sides of the drawer will register accurately and neatly therewith. The measuring guide disclosed herein is easily attached to the motor driving the dovetail router and the measuring gauge is positioned adjacent thereto so that as the motor and dovetail router are moved vertically they may be aligned with a scale or scales formed on the gauge and the dovetail slots thereby uniformly and accurately positioned.

With the foregoing and other objects in view which will appear as the description proceeds the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a composite perspective view illustrating the measuring gauge and guide, a portion of the motor and dovetail router and a workpiece.

FIGURE 2 is a side elevation on a reduced scale of the radial arm power tool with the motor, the measuring guide and gauge in assembled relation.

FIGURE 3 is a front plan view of the measuring guide seen in FIGURES 1 and 2.

FIGURE 4 is a side elevation of a portion of the measuring gauge seen in FIGURES 1 and 2.

By referring to the drawings and FIGURE 2 it will be seen that a radial arm power tool is shown in which the arm 10 carries a depending yoke 11 which in turn pivotally mounts an electric motor 12. The arrangement of the mounting of the yoke 11 is such, as will be understood by those skilled in the power tool art, that the motor 12 may be moved vertically, rotated on the axis of the yoke 11 and pivoted on the pivot carried by the yoke 11. As illustrated, the motor is positioned at right angles to the radial arm and with its drive shaft on a horizontal plane.

A threaded mounting stud 13 on the motor 12 is provided for mounting various tools and the like thereon in connection with the threaded drive shaft 14 of the motor.

In FIGURE 2 a dovetail router 15 is illustrated and in the exploded arrangement of composite FIGURE 1 it is shown in axial alignment with the threaded shaft 14 of the motor 12. A guide member comprising a plate 16 having an arcuate cut-away opening 17 therein is provided with a flange 18 on its upper edge and which flange 18 is apertured as at 19 and is positioned thereby on the threaded stud 13 of the motor 12 as shown in FIGURE 2 of the drawing. In such position, the arcuate cut-away opening 17 is positioned around the threaded shaft 14 of the motor which thereby extends therethrough. The guide member 16 is provided with a secondary flange 20 on one of its vertical edges and the flange 20 has a window 21 formed therein with a section of transparent material 22 positioned therein. The transparent material 22 carries a guide line 23. A frame 24 is pivotally mounted by a pivot 25 on the flange 20 of the guide member 16 near the upper portion thereof as best seen in FIGURES 1 and 2 of the drawings and which frame 24 has a section of transparent material 26 therein which in turn is provided with a guide line 27.

The power tool has a worktable 28 for supporting a workpiece and a gauge 29 is positioned thereon in free standing relation by means of a supporting bracket 30 which includes a central member in which an adjustment bolt 31 is threadably engaged. The adjustment bolt 31 passes through a slot 32 in the gauge 29 so that the same can be adjusted vertically relative to the table 28. As illustrated in FIGURE 2 of the drawings the gauge 29 is positioned adjacent the secondary flange 20 on the guide member 16 which is arranged so that the horizontal guide line 23 in window 21 thereof is on the same horizontal plane as the motor shaft 14 and dovetail router 15. The exact height of the dovetail router 15 may thereby be determined by moving the gauge 29 adjacent to the window 21 and comparing the reading on the scale thereof with the guide line 23. As illustrated in FIGURES 1 and 2, it will be seen that the horizontal plane of the dovetail router 15 is thereby at exactly 2" above the table 28 as readily disclosed by the gauge 29.

It will thus be seen that a workpiece W, for example, comprises a front drawer panel positioned on the table 28 with one of its vertical edges moved into engagement with the dovetail router 15. It will be seen that the center line of the dovetail slot to be formed in the front drawer panel W will be at exactly the 2" mark in the gauge 29 and that successive vertically spaced dovetail slots can be formed with even spacing by elevating the motor 12 to bring the guide line 23 into successive registry with the proper scale markings on the gauge 29. Those skilled in the art will observe that some work pieces will require drilled openings or dovetail slots or other operations which are not on a horizontal plane as is the dovetail router 15 herein disclosed and that when such conditions exist, and the motor drive shaft is at an angle to horizontal, the frame 24 with its guide line 27 may be moved to an appropriate position so that equal spacing in conjunction with the gauge 29 can still be obtained. For example, when the motor 12 is set with its drive shaft at a 45° angle the frame 24 can be positioned approximately as shown in FIGURE 2 of the drawings and the horizontal guide line 27 therein will then align with the horizontal markings on the gauge 29 which can be positioned adjacent thereto.

It will thus be seen that a simple and efficient measuring gauge and guide combination has been disclosed which is particularly useful in connection with the operation of power tools where vertically spaced slots or a plurality of openings are to be formed in a workpiece. In FIGURE 3 of the drawings a front view of the guide member 16 may be seen and in FIGURE 4 of the drawings a side elevation of the bottom portion of the gauge 29 and its support 30 may be observed and it will be observed that the adjustment bolt 31 passes through the slot 32 in the guide 29 and through the upturned end of a secondary gauge 29A which is generally horizontal and provided with a desirable scale and the upturned end of which is secured to the vertical side pieces forming the support 30. A section of material 30A is also engaged by the adjustment bolt 31 as may be best seen in FIGURE 4.

Having thus described my invention, what I claim is:

1. The combination of a measuring gauge and guide for a power tool, said power tool including a motor having a drive shaft for mounting a tool thereon and a fastener, said guide comprising a member having an arcuate cut-out section and an apertured flange mounted on said fastener on said motor with said cut-out partially encircling said drive shaft of said motor, a secondary flange on one vertical edge of said guide member, a window in said secondary flange and a horizontal guide line on said window, said gauge comprising a support having a vertically disposed member adjustably secured thereto, said vertically disposed member having a scale thereon, said gauge arranged to be positioned alongside said vertical flange and said window therein so that said guide line on said window can be brought into alignment with the scale on said gauge whereby the position of said drive shaft may be determined.

2. The combination set forth in claim 1 and wherein said fastener on said motor comprises a threaded stud and wherein a nut is positioned on said threaded stud to clamp said apertured flange on said guide member thereto.

3. The combination of a vertical gauge having a vertically spaced scale thereon, a guide member having a horizontal guide line thereon and a power tool including a motor mounted for various positioning relative to said tool and including a threaded stud, said guide member including a vertically disposed section having a horizontal flange at its upper edge and a right angularly disposed flange on one of its vertical edges, said horizontal flange having an opening therein engageable with said threaded stud on said motor and a butterfly nut engaged on said stud and positioned against said flange, a horizontal guide line on said right angularly disposed flange for alignment with said scale on said gauge member, said guide line on said right angular flange being on the same horizontal plane as the drive shaft of said motor.

4. The combination guide means and gauge set forth in claim 3 and wherein said gauge has a support structure on its lower end including a pair of spaced vertically disposed members and an L-shaped member positioned therebetween and extending outwardly therefrom and wherein said gauge member is adjustably mounted to the vertical portion of said L-shaped member.

References Cited in the file of this patent
UNITED STATES PATENTS

| | | |
|---|---|---|
| 319,751 | Shimer | June 9, 1885 |
| 2,990,732 | Ide | July 4, 1961 |
| 3,021,604 | Moore | Feb. 20, 1962 |